United States Patent
Kumon et al.

(10) Patent No.: US 6,903,678 B2
(45) Date of Patent: Jun. 7, 2005

(54) VEHICLE RADAR APPARATUS

(75) Inventors: Hiroaki Kumon, Kariya (JP); Yukimasa Tamatsu, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/764,551

(22) Filed: Jan. 27, 2004

(65) Prior Publication Data

US 2004/0183713 A1 Sep. 23, 2004

(30) Foreign Application Priority Data

Jan. 31, 2003 (JP) ......................................... 2003-024612

(51) Int. Cl.[7] ............................................. G01S 13/95
(52) U.S. Cl. ....................... 342/70; 342/192; 342/196; 342/159; 342/107; 342/26 D
(58) Field of Search ........................... 342/70–72, 26 R, 342/26 D, 98, 99, 102, 104, 107, 115, 116, 159, 192, 196

(56) References Cited

U.S. PATENT DOCUMENTS

| | | | | |
|---|---|---|---|---|
| 5,864,314 A | * | 1/1999 | Ashihara | 342/128 |
| 6,073,078 A | * | 6/2000 | Kitahara et al. | 701/300 |
| 6,081,223 A | * | 6/2000 | Kitahara et al. | 342/70 |
| 6,157,339 A | | 12/2000 | Sato et al. | 342/70 |
| 6,278,399 B1 | * | 8/2001 | Ashihara | 342/173 |
| 6,320,531 B1 | | 11/2001 | Tamatsu | 342/109 |
| 6,414,623 B1 | * | 7/2002 | Ashihara | 342/70 |
| 6,445,335 B1 | * | 9/2002 | Tamatsu | 342/70 |
| 2003/0217880 A1 | * | 11/2003 | Isogai et al. | 180/170 |
| 2004/0183713 A1 | * | 9/2004 | Kumon et al. | 342/70 |

FOREIGN PATENT DOCUMENTS

| | | |
|---|---|---|
| JP | 57-142575 | 9/1982 |
| JP | 11-133143 | 5/1999 |
| JP | 2000-28704 | 1/2000 |
| JP | 2001-99918 | 4/2001 |
| JP | 2001-166042 | 6/2001 |

OTHER PUBLICATIONS

"Radar signature of the sea surface perturbed by rain", Craeye, C.; Sobieswki, P.W.; Bliven, L.F.; Geoscience and Remote Sensing Symposium, 1999. IGARSS '99 Proceedings. IEEE 1999 International, vol.: 1, Jun. 28–Jul. 2 pp.: 206–208.*

* cited by examiner

Primary Examiner—John B. Sotomayor
(74) Attorney, Agent, or Firm—Posz Law Group, PLC

(57) ABSTRACT

A vehicle radar system extracts peak frequencies fbu and fbd of respective beat signals B1 to B9 representing the frequency difference between a transmission signal fs and a plurality of received signals fr1 to fr9. The phase difference of respective beat signals B1 to B9 at the peak frequencies fbu and fbd is converted into a frequency signal. In the case of reflection from a close range road surface or raindrops, the phase difference of each beat signal is irregular. The peak frequency intensity of a converted frequency signal is small. This system compares the peak frequency intensity of the converted frequency signal with predetermined criterion intensity. Then, the system identifies an objective with a close range road surface or raindrops when the peak frequency intensity of the converted frequency signal is not larger than the predetermined criterion intensity.

8 Claims, 11 Drawing Sheets

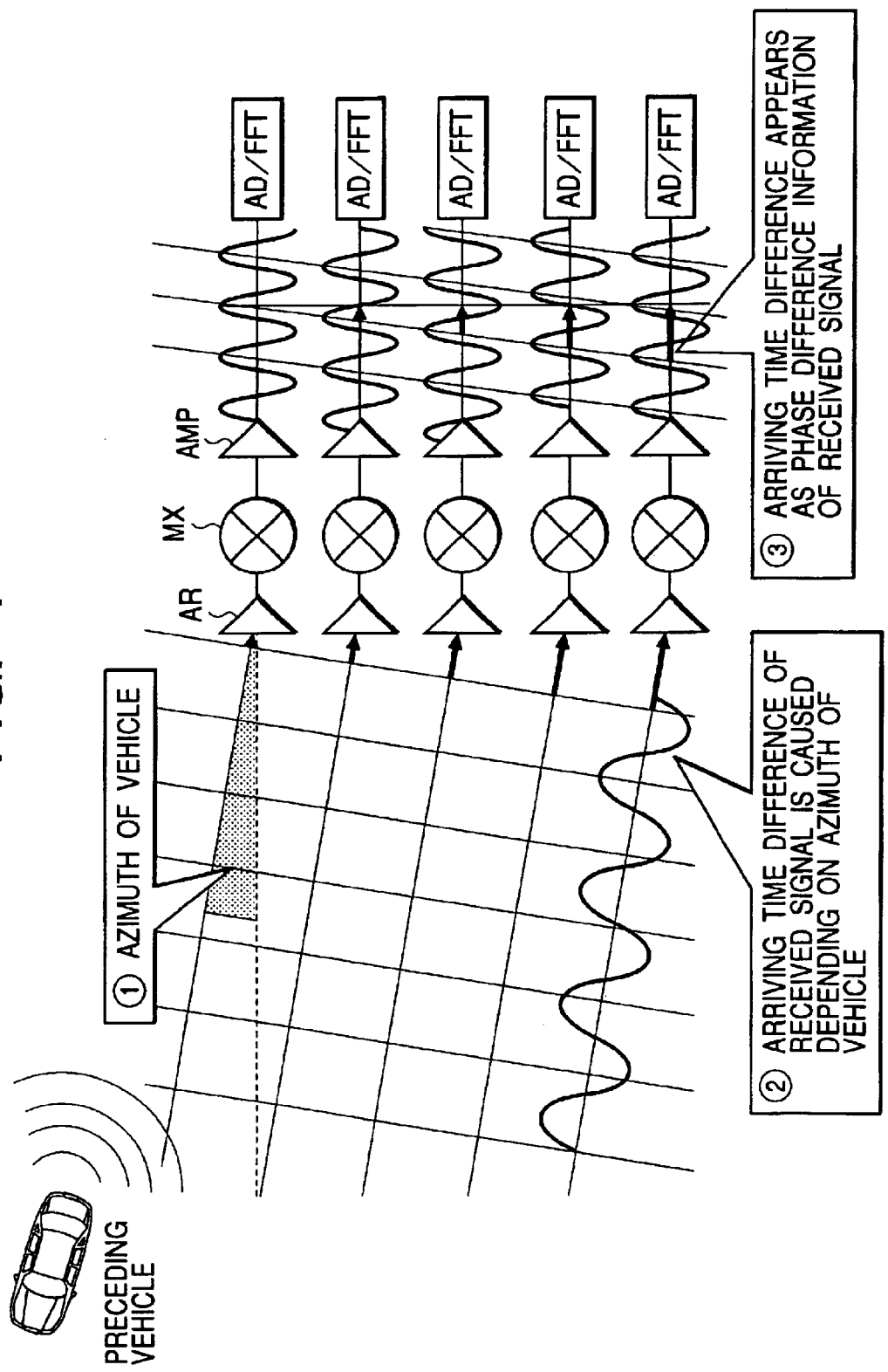

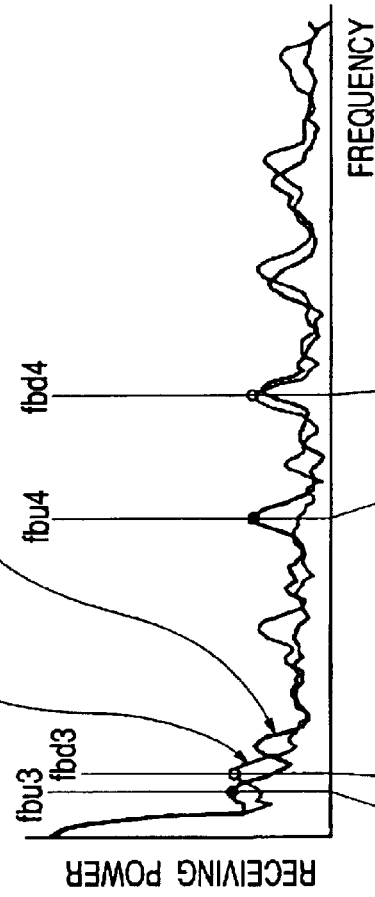
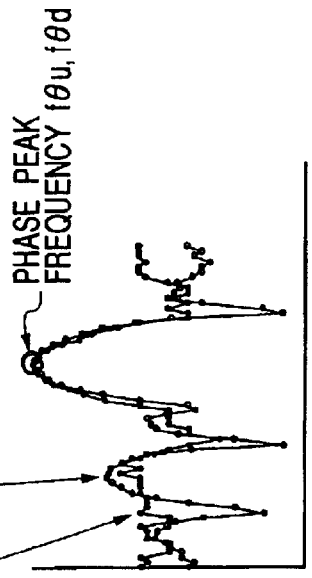
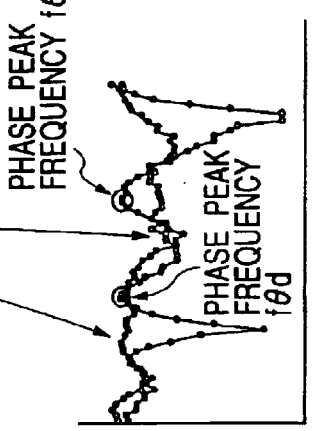
FIG. 5A
FIG. 5C
FIG. 5B

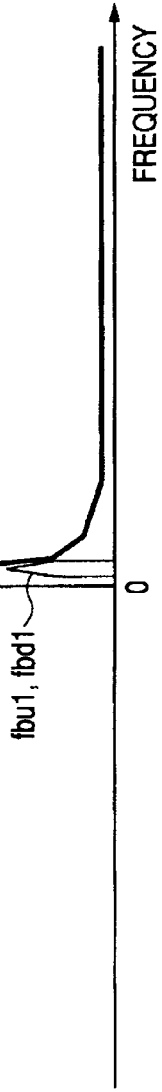
FIG. 10A
FIG. 10B

VEHICLE RADAR APPARATUS

BACKGROUND OF THE INVENTION

This invention relates to a vehicle radar apparatus which transmits and receives radar waves and is capable of detecting an objective existing around a vehicle based on reflected radar waves.

Conventionally, a FMCW type radar apparatus is known as a representative vehicle radar apparatus which transmits, as a signal carried on the radar wave, a triangular wave transmission signal fs having the frequency gradually increasing and decreasing cyclically as shown in FIG. 7A and receives radar waves reflected from an objective to generate a received signal fr (refer to the Japanese Patent Application Laid-open No. 2001-166042). This radar apparatus obtains frequencies fbu and fbd shown in FIG. 7B based on mixing of the received signal fr and the transmission signal fs. The frequencies fbu and fbd correspond to the frequency difference between the transmission signal fs and the received signal fr. More specifically, the frequency analysis using a signal processing device or the like is applied to a frequency difference signal (i.e., a beat signal) representing the frequency difference between the transmission signal fs and the received signal fr. As a result of this frequency analysis, the ascending section peak frequency fbu is extracted from an ascending section in which the frequency of transmission signal fs gradually increases, and the descending section peak frequency fbd is extracted from a descending section in which the frequency of transmission signal fs gradually decreases.

As shown in FIG. 7A, when a vehicle installing this radar apparatus and an objective reflecting the radar wave are mutually equal in the shifting speed (i.e., relative speed V=0), the radar wave reflected by the objective arrives the radar apparatus with a delay time equivalent to a time required for going and returning the distance D between the vehicle and the objective. In this case, the received signal fr is substantially coincident with the transmission signal fs if it shifts along the time axis by the amount of this delay time. The ascending section peak frequency fbu is equal to the descending section peak frequency fbd (i.e., fbu=fbd).

On the other hand, when the vehicle installing this radar apparatus and the objective reflecting the radar wave are mutually different in the shifting speed (i.e., relative speed V≠0), the radar wave reflected by the objective is subjected to the Doppler shift in accordance with the relative speed V of the objective. Accordingly, the received signal fr shifts along the frequency axis by the amount of the Doppler shift corresponding to the relative speed V in addition to the amount of delay time corresponding to the distance D of the objective. In this case, the ascending section peak frequency fbu is not equal to the descending section peak frequency fbd (i.e., fb1≠fb2).

In this manner, the received signal fr shifts in the time axis direction as well as in the frequency axis direction in accordance with the distance D and the relative speed V of the objective. In other words, the frequency difference between the transmission signal fs and the received signal fr appearing in the time axis is dependent on the distance D of the objective, while the frequency difference appearing in the frequency axis is dependent on the relative speed V. The frequency fb corresponding to the distance D and the frequency fd corresponding to the relative speed V can be obtained from the following equations 1 and 2.

$$fb=(|fbu|+|fbd|)/2 \quad (1)$$

$$fd=(|fbu|-|fbd|)/2 \quad (2)$$

In other words, the frequency fb corresponding to the distance D and the frequency fd corresponding to the relative speed V can be obtained based on the ascending section peak frequency fbu and the descending section peak frequency fbd. Then, from the frequencies fb and fd corresponding to the distance D and the relative speed V, the following equations 3 and 4 can be introduced to calculate the distance D and the relative speed V of the objective.

$$D=\{C/(4 \times \Delta F \times fm)\} \times fb \quad (3)$$

$$V=\{C/(2 \times f0)\} \times fd \quad (4)$$

where $\Delta F$ represents a frequency modulation width of the transmission signal fs, f0 represents a central frequency of the transmission signal fs, fm represents a repetition frequency, and C represents the velocity of light.

In general, each radar apparatus has a limited detection range in which an objective is detectable. The detection range is dependent on the irradiation direction of the radar wave emitted from a transmitting antenna, i.e., dependent on the directivity of the transmitting antenna. Accordingly, the directivity of the transmitting antenna is determined in such a manner that the radar wave has a desired width in each of the vertical direction and the horizontal direction. For example, considering the fact that the vehicle body causes pitching in the up-and-down direction and the road is not always parallel to the radar wave, the directivity in the vertical direction is determined so as to have a certain degree of margin in width However, as shown in FIG. 8, although the amount is small, the radar wave is inevitably irradiated toward the direction being not aimed. In other words, some of the irradiated radar wave excurses outside the determined irradiation range. If such radar wave is reflected by a road surface near a vehicle body (hereinafter, referred to as "close range road surface"), the reflected wave may be received by a receiving antenna of the radar apparatus. Namely, the receiving antenna possibly receives reflected waves returning from the close range road surface in addition to the reflected waves returning from a preceding vehicle or any other objective ahead of this radar apparatus equipped vehicle.

The received signal, even when carried on the reflected wave returning from the close range road surface, shifts in accordance with the distance and the relative speed between the vehicle and the road surface, and accordingly the frequency difference between the transmission signal and the received signal changes. As shown in FIGS. 9A and 9B, when the system own vehicle is in a stopped condition with a relative speed 0 against the road surface, the ascending section peak frequency fbu1 and the descending section peak frequency fbd1 become the same low frequency (fbu1=fbd1) because the beat signal produced from the transmission signal fs and the received signal fr1 is based on the reflection from the close range road surface.

On the other hand, when the vehicle is traveling and the reflected wave returning from the close range road surface is subjected to the Doppler shift, the received signal fr2 shifts to a position exceeding the ascending section of the transmission signal fs as shown in FIG. 9A. As a result, as shown in FIG. 9C, the ascending section peak frequency fbu2 becomes a negative frequency while both the ascending section peak frequency fbu2 and the descending section peak frequency fbd2 become large in their absolute values.

In this case, it is always recognized in the radar apparatus that some of the radar waves emitted from the transmitting antenna directly sneaks into the receiving antenna. Thus, as shown in FIG. 10A, the receiving intensity (i.e., receiving power) is maximized at an extremely low-frequency region. The received signal, carried on the reflected wave returning from the close range road surface under the condition that the vehicle is stopped, is completely involved or concealed in this extremely low-frequency region. Thus, the receiving intensity of the received signal from the close range road surface is not detectable through the frequency analysis or comparable signal processing.

However, when the vehicle is traveling, the received signal fr2 carried on the reflected wave returning from the close range road surface is subjected to the Doppler shift as described above. Accordingly, both of the ascending section peak frequency fbu2 and the descending section peak frequency fbd2 of the beat signal shift out of the extremely low-frequency region as shown in FIG. 10B. In this case, the ascending section peak frequency fbu2 becomes a negative frequency. However, the radar apparatus calculates it as a positive frequency because the negative frequency is processed as having an inverse sign in the frequency analysis or other signal processing.

It is needless to say that the radar apparatus should not identify a close range road surface with the objective to be detected. Accordingly, executing the processing based on the peak frequencies fbu2 and fbd2 originated from a close range road surface results in erroneous detection of the objective.

Similarly, when it is raining, there is the possibility that radar apparatus receives the reflected wave returning from raindrops. In other words, the reflected wave returning from the raindrops will cause erroneous detection of the objective. Especially, the received signal carried on the reflected wave returning from the raindrops tends to have a higher receiving intensity compared with the received signal carried on the reflected wave returning from a close range road surface. Thus, the possibility of erroneously detecting the objective will increase.

FIGS. 11A, 11B, and 11C show power spectrums representing the intensity of each frequency component of the beat signal in the frequency ascending section as well as in the frequency descending section. FIG. 11A shows a power spectrum in a vehicle stopped condition, FIG. 11B shows a power spectrum in a vehicle traveling condition on a dried road surface, and FIG. 11C shows a power spectrum in a rainy vehicle traveling condition. As understood from FIGS. 11A and 11B, a peak frequency not being recognized in the vehicle stopped condition appears in the low-frequency region once the vehicle starts traveling. Furthermore, as shown in FIG. 11C, the peak frequency appearing in the low-frequency region has large peak intensity when it is raining.

To solve this problem, using a high pass filter to cut the peak frequency in the low-frequency region is conventionally proposed. However, this is not preferable because an objective residing in the vicinity of the vehicle becomes undetectable.

SUMMARY OF THE INVENTION

In view of the above-described problem, the present invention has an object to provide a vehicle radar apparatus which is capable of surely discriminating the reflected wave returning from a close range road surface or raindrops.

In order to accomplish the above and other related objects, the present invention provides a vehicle radar apparatus including transmitting means for transmitting a transmission signal which is frequency modulated so as to change continuously in frequency. A plurality of receiving means are disposed at predetermined intervals for receiving reflected waves when the transmission signal is reflected by an objective and for generating a plurality of received signals. A beat signal generating means is provided for generating beat signals each corresponding to a frequency difference between the transmission signal and each of the received signals generated from the plurality of receiving means. A converting means is provided for extracting a peak frequency of at least one beat signal generated from the beat signal generating means and for converting a phase difference of the beat signal at the peak frequency into a frequency signal. And, a judging means is provided for identifying the objective with a close range road surface or raindrops when a peak frequency intensity of the frequency signal converted by the converting means is smaller than predetermined criterion intensity.

As described above, the vehicle radar apparatus according to this invention includes a plurality of receiving means. Each receiving means receives the reflected wave returning from the objective and generates the received signal. If the arriving direction of the reflected wave is not perpendicular to the front face of the plurality of receiving means, the propagation distance of the reflected wave will be different in each receiving means. Accordingly, with respect to the reflected wave returning from the same objective, a significant phase difference will be caused among received signals generated from these receiving means. On the other hand, in the case of reflection from a close range road surface or raindrops, the reflected wave arrives from a wide angular range spreading in front of the radar apparatus, not from a specific angle. Accordingly, the received signal has no phase difference corresponding to any specific azimuth in the case of reflection from a close range road surface or raindrops.

In view of the above-described point, the vehicle radar apparatus of this invention discriminates the received signal carried on the reflected wave returning from the close range road surface or raindrops. Namely, the vehicle radar apparatus of this invention generates the beat signal representing a frequency difference between the transmission signal and each of the received signals generated from the plurality of receiving means, extracts the peak frequency of at least one beat signal, and converts the phase difference of each beat signal at the peak frequency into a frequency signal. In this case, when the reflected wave arrives from a specific azimuth, the phase difference of each beat signal at the peak frequency has the regularity. When the phase difference having the regularity is converted into a frequency signal, this frequency signal has a peak appearing at the frequency corresponding to the phase difference. On the other hand, when the reflected wave arrived from a close range road surface or raindrops, the phase difference of each beat signal is irregular. The peak frequency intensity of the frequency signal is small compared with the above-described case.

Accordingly, the vehicle radar apparatus of this invention identifies the objective with a close range road surface or raindrops when the peak frequency intensity of the frequency signal converted by the converting means is smaller than predetermined criterion intensity.

According to a preferred embodiment of the vehicle radar apparatus, the judging means determines the predetermined criterion intensity with reference to the peak frequency intensity of the beat signal. The frequency signal is calculated based on the phase difference of each beat signal at the peak frequency. Thus, the peak frequency intensity of the original beat signal gives influence to the peak frequency intensity of the frequency signal.

Furthermore, when the predetermined criterion intensity is determined with reference to the peak frequency intensity of the beat signal, it is desirable to determine the predetermined criterion intensity with reference to an average intensity which is obtained by averaging the peak frequency intensity of respective beat signals. Theoretically, each receiving means generates a received signal having the same intensity when the reflection signal is the same. However, it is usual that each receiving means is slightly different in the performance of a receiving antenna or the like. Thus, the intensity of each received signal is not always the same. It is accordingly preferable to determine the predetermined criterion intensity with reference to the average intensity which is obtained by averaging the peak frequency intensity of respective beat signals.

According to a preferred embodiment of the vehicle radar apparatus, the transmission signal includes an ascending section in which the frequency ascends in a predetermined frequency range and a descending section in which the frequency descends in another predetermined frequency range. The converting means extracts, as the peak frequency of the beat signal, an ascending section peak frequency and a descending section peak frequency in the ascending section and the descending section of the transmission signal, respectively. And, the converting means converts the phase difference of respective beat signals at the ascending section peak frequency and the descending section peak frequency into an ascending section frequency signal and a descending section frequency signal. The judging means identifies the objective with a close range road surface or raindrops when an ascending section peak frequency intensity of the ascending section frequency signal is smaller than a predetermined criterion intensity determined with reference to an ascending section peak frequency intensity of the beat signal, and when a descending section peak frequency intensity of the descending section frequency signal is smaller than a predetermined criterion intensity determined with reference to a descending section peak frequency intensity of the beat signal.

With this arrangement, the judgment as to whether or not the frequency peak of the converted frequency signal has reached the predetermined criterion intensity becomes feasible based on the ascending section frequency peak and the descending section frequency peak. The judging accuracy is improved. Only when the ascending section frequency peak and the descending section frequency peak do not reach the predetermined criterion intensity, the objective is identified with a close range road surface or raindrops. Therefore, the reflection from a close range road surface or raindrops is surely discriminable.

Preferably, the judging means executes judging processing for comparing the peak frequency intensity of the frequency signal with the predetermined criterion intensity only when the peak frequency of the beat signal is generated in a predetermined low-frequency region. The peak frequency of the beat signal derived from the reflected wave returning from a close range road surface or raindrops tends to appear in the low-frequency region, because the distance to the close range road surface or raindrops is short. Therefore, the judging means executes the judging processing only when the peak frequency of the beat signal is generated in the predetermined low-frequency region. In other words, the comparison judging processing is effectively executed only when it is necessary. The burden of the processing device can be reduced.

Preferably, the range of the low-frequency region is changed in accordance with a vehicle traveling speed. In general, the Doppler shift amount relative to a close range road surface or raindrops changes in accordance with the vehicle traveling speed. Accordingly, the peak frequency of the beat signal varies.

Preferably, the converting means calculates the intensity of each frequency by executing frequency analysis on each beat signal, and extracts the peak frequency of the beat signal based on the result obtained by averaging the calculated intensity of each frequency among respective beat signals.

A plurality of receiving means receive the reflected wave returning from the same objective. When respective beat signals are calculated based on these received signals, all of the beat signals have the peak frequency at the same frequency. Accordingly, when at least one beat signal generates a peak frequency, it can be assumed that the rest of the beat signals generate the similar peak frequency.

However, it is usual that respective beat signals contain different noises, and accordingly each beat signal has different frequency components. Furthermore, in the case of reflection from a close range road surface or raindrops, the reflected wave arrives from a wide angular region spreading in front of the vehicle body. The peak frequency itself tends to cause a significant difference.

Hence, it is preferable that the radar apparatus averages the frequency intensity of respective beat signals and extracts the peak frequency of the beat signal based on the averaged result. As the noises are random, executing the averaging processing makes it possible to reduce the noise component intensity relative to the peak frequency intensity. The S/N ratio is improved. The peak frequency of the beat signal can be accurately extracted.

Preferably, the judging means repetitively executes the judging processing for comparing the peak frequency intensity of the frequency signal with the predetermined criterion intensity at predetermined periods, and identifies the objective with the close range road surface or the raindrops based on judgment result obtained through a plurality of comparisons.

Even if the case that the reflected wave returns from a close range road surface or raindrops, there is the possibility that the peak frequency intensity of a frequency signal may exceed the predetermined criterion intensity due to the influence of noises. Accordingly, to eliminate any erroneous judgment, it is preferable to identify the objective with a close range road surface or raindrops based on judgment result obtained through a plurality of comparisons.

BRIEF DESCRIPTION OF THE DRAWINGS

The above and other objects, features and advantages of the present invention will become more apparent from the following detailed description which is to be read in conjunction with the accompanying drawings, in which:

FIG. 4 is a diagram explaining the principle in the judgment as to whether the objective generating the reflected wave is a close range road surface or raindrops;

FIG. 5A is a waveform diagram showing one example of average spectrum data obtained through averaging processing applied on frequency spectrum data calculated with respect to respective beat signals B1 to B9 in each of the frequency ascending section and the frequency descending section;

FIG. 5B is a waveform diagram showing the result (frequency spectrum data) of phase FFT applied to the phase difference of respective beat frequency signals BF1 to BF9 having an ascending section peak frequency fbu3 and a descending section peak frequency fbd3 generated by the reflected wave returning from raindrops;

FIG. 5C is a waveform diagram showing the result (frequency spectrum data) of phase FFT applied to the phase difference of respective beat frequency signals BF1 to BF9 having an ascending section peak frequency fbu4 and a descending section peak frequency fbd4 generated by the reflected wave returning from a preceding vehicle;

FIG. 7A is a graph showing a transmission signal fs and a received signal fr, while

FIG. 10A is a graph showing the frequency spectrum data of a beat signal in the vehicle stopped condition;

FIG. 10B is a graph showing the frequency spectrum data of the beat signal in the vehicle traveling condition;

DESCRIPTION OF THE PREFERRED EMBODIMENT

A preferred embodiment of the present invention will be explained hereinafter with reference to attached drawings.

Figure 1:
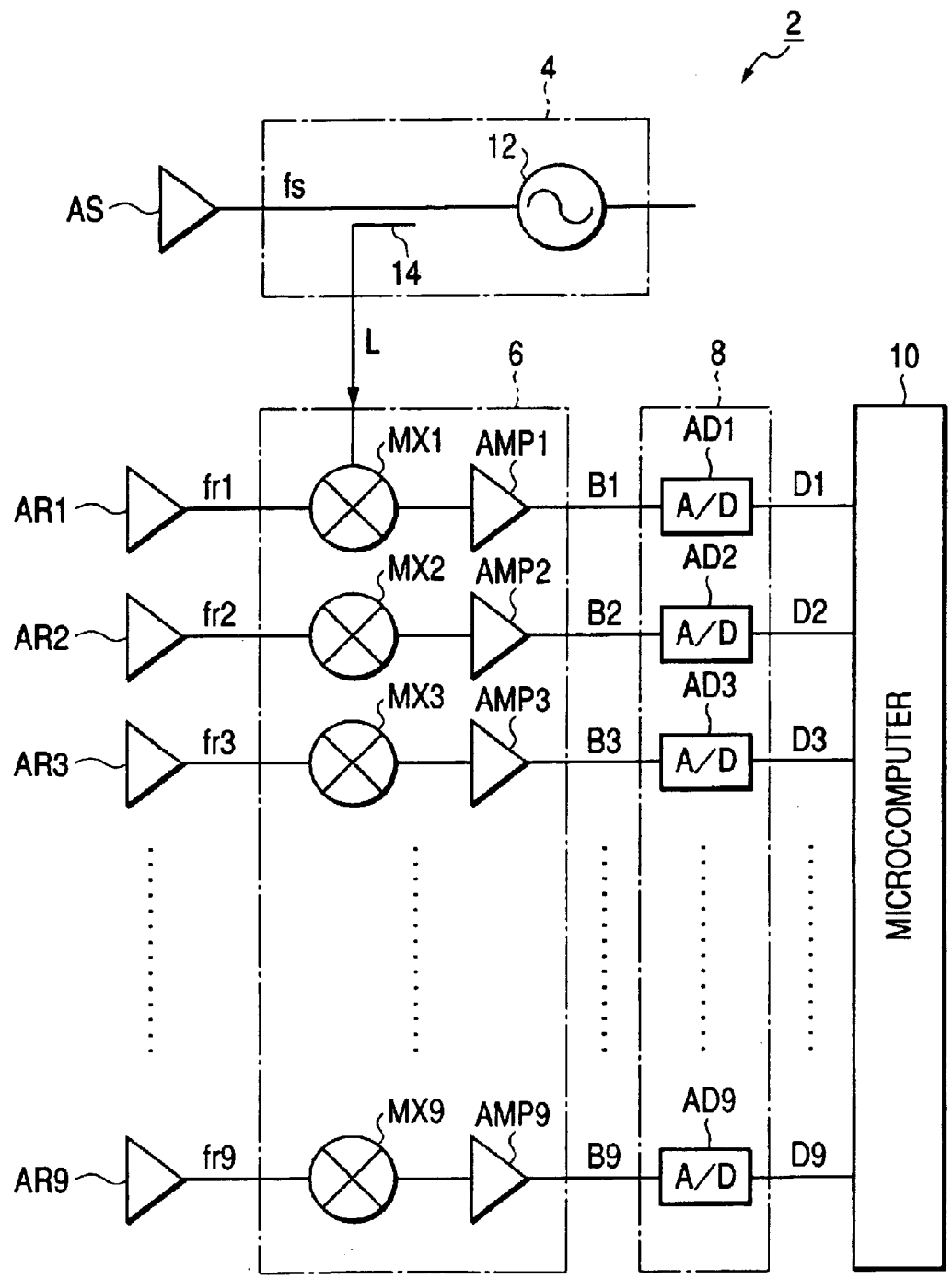
FIG. 1 is a block diagram showing an overall arrangement of a vehicle radar apparatus in accordance with a preferred embodiment of the present invention.

FIG. 1 is a block diagram showing an overall arrangement of a vehicle radar apparatus in accordance with this embodiment.

As shown in FIG. 1, a radar apparatus 2 of this embodiment includes a transmitter 4 capable of transmitting radar waves of a millimeter waveband via a transmitting antenna AS. The transmitter 4 includes a high-frequency oscillator 12 and a distributor 14. The high-frequency oscillator 12 generates a high-frequency signal of a millimeter waveband being modulated in such a manner that the frequency gradually increases and decreases repetitively with elapsed time. The distributor 14 has a power distributing function to separate the output of high-frequency oscillator 12 into a transmission signal fs and a local signal L. The transmission signal fs is supplied to the transmitting antenna AS, and the local signal L is supplied to a receiver 6.

Furthermore, the radar apparatus 2 of this embodiment includes a total of nine receiving antennas AR1 to AR9 being aligned at equal intervals for receiving the radar wave (hereinafter, referred to as "reflected wave") being reflected by a preceding vehicle or other objective. When the reflected wave is received by each of nine antennas AR1 to AR9, respective antennas AR1 to AR9 generate received signals fr1 to fr9 according to the reflected wave. The received signals fr1 to fr9 are sent to the receiver 6.

The receiver 6 includes a total of nine mixers MX1 to MX9 and the same number of amplifiers AMP1 to AMP9 so as to correspond to respective antennas AR1 to AR9. Respective mixers MX1 to MX9 have a function of mixing the corresponding received signals fr1 to fr9 with the local signal L to generate beat signals B1 to B9 representing the frequency difference of the mixed signals. The beat signals B1 to B9 being generated by respective mixers Mx1 to MX9 are amplified by the amplifiers AMP1 to AMP9, respectively. The amplifiers AMP 1 to AMP9 have a filtering function to remove unnecessary high-frequency components from the beat signals B1 to B9.

The beat signals B1 to B9 being amplified by the amplifiers AMP 1 to AMP9 are supplied to an A/D converter 8. The A/D converter 8 includes a total of nine A/D converters AD1 to AD9 which performs the sampling of corresponding beat signals B1 to B9 to convert them into digital data D1 to D9. The digital data D1 to D9 of respective beat signals B1 to B9 being converted by the A/D converters AD1 to AD9 are supplied to a microcomputer 10 and used for various signal processing.

The microcomputer 10, consisting chiefly of CPU, ROM, and RAM, executes the judging processing for making a judgment based on digital data D1 to D9 supplied from the A/D converter 8 as to whether or not the objective is a close range road surface or raindrops, and also executes the detecting processing for detecting the distance, relative speed, and azimuth of a preceding vehicle or other objective. Furthermore, the microcomputer 10 includes a digital signal processor or the like for executing the fast Fourier transformation (FFT) processing applied to the digital data D1 to D9 when the above-described processing is carried out.

Figure 7A:
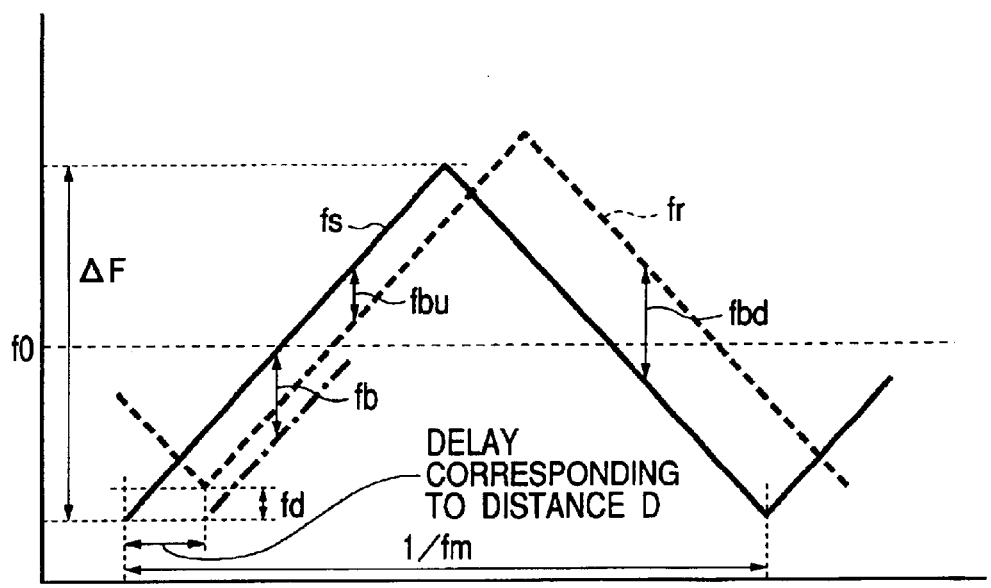
Figure 7B:
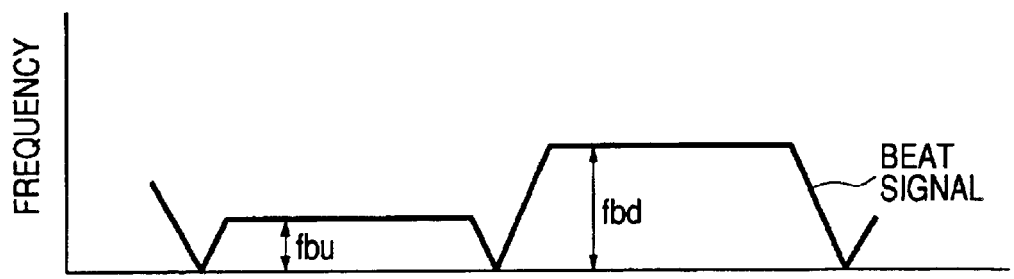
FIG. 7B is a graph showing a beat frequency corresponding to the frequency difference between the transmission signal fs and the received signal fr, both being prepared to explain the objective detecting principle used in a conventional FMCW type radar apparatus.
Figure 8:
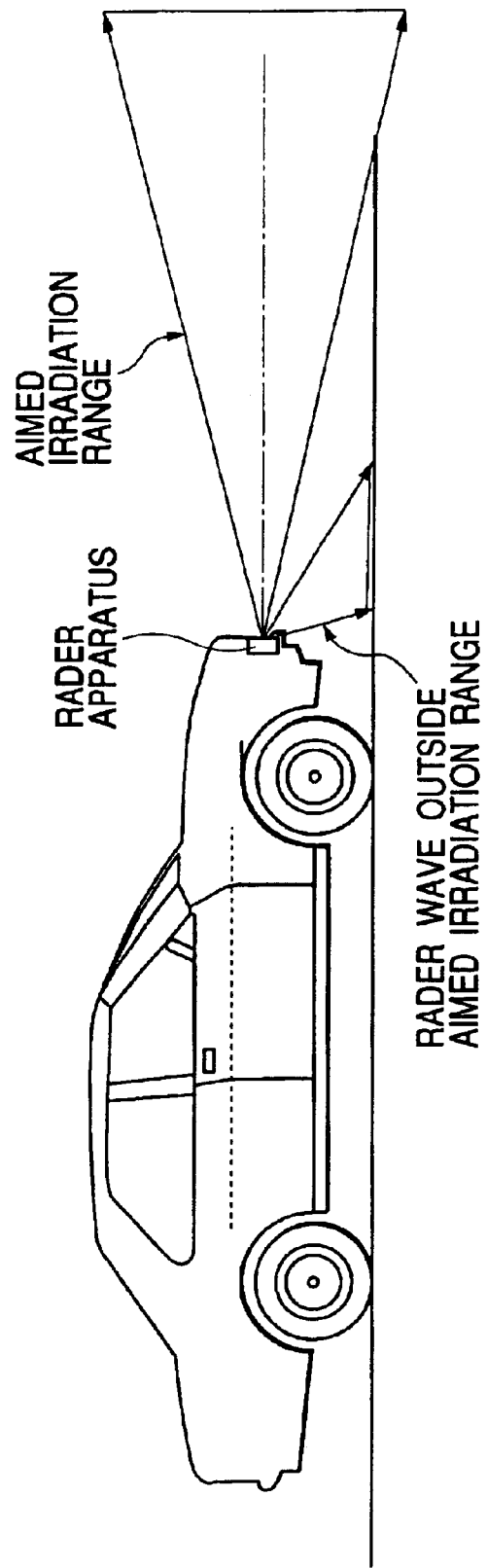
FIG. 8 is a diagram explaining an irradiation range of the radar wave.
Figure 9A:
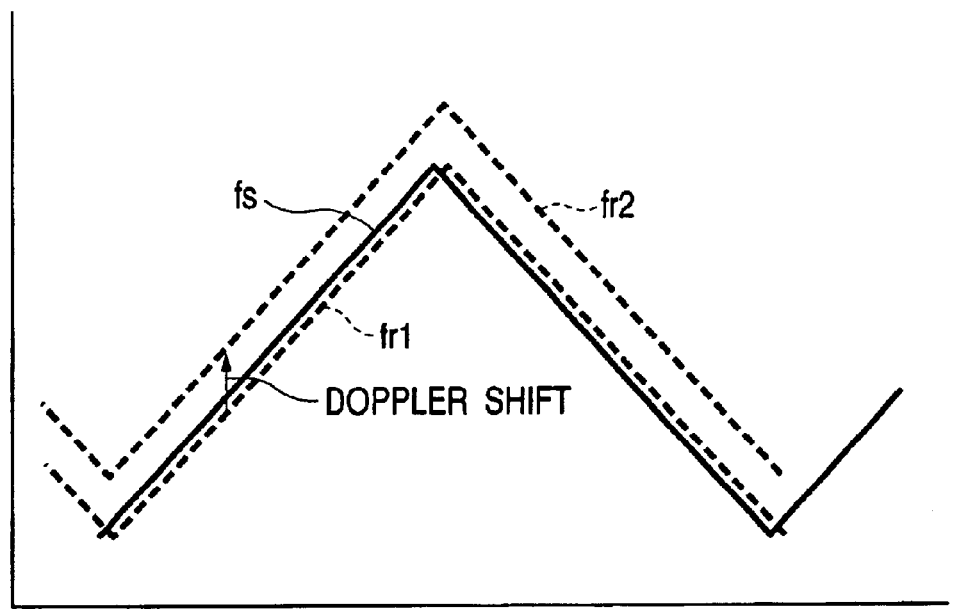
FIG. 9A is a waveform diagram showing the difference in the frequency shift amount of a received signal between a vehicle stopped condition and a vehicle traveling condition.
Figure 9B:
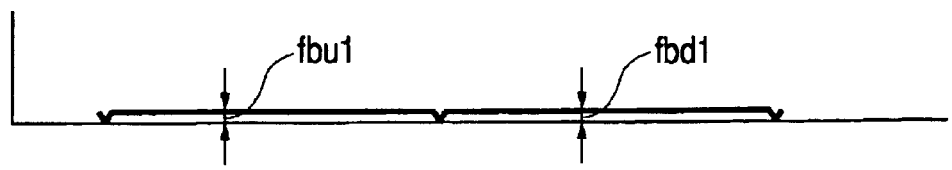
FIG. 9B is a waveform diagram showing an ascending section peak frequency fbu1 and a descending section peak frequency fbd1 in the vehicle stopped condition.
Figure 9C:
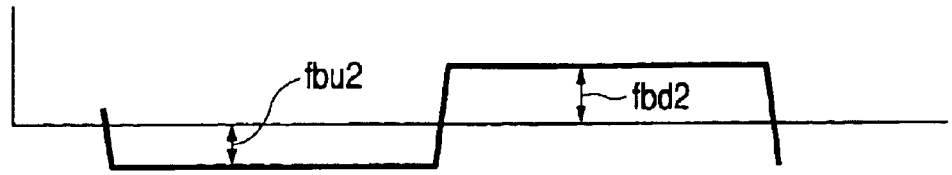
FIG. 9C is a waveform diagram showing an ascending section peak frequency fbu2 and a descending section peak frequency fbd2 in the vehicle traveling condition.
Figure 11A:
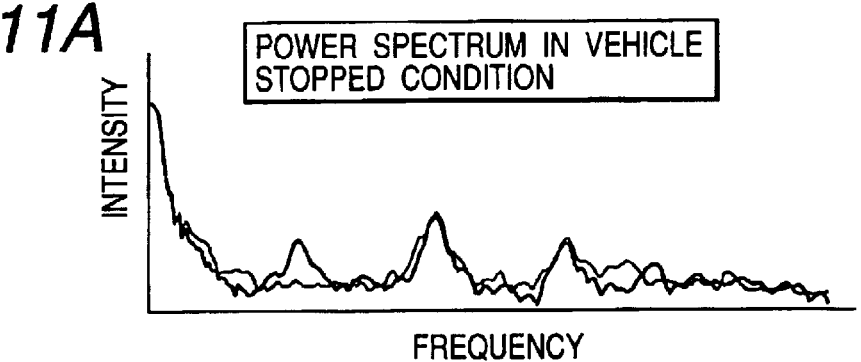
FIG. 11A is a graph showing the frequency spectrum data of the beat signal in the vehicle stopped condition.
Figure 11B:
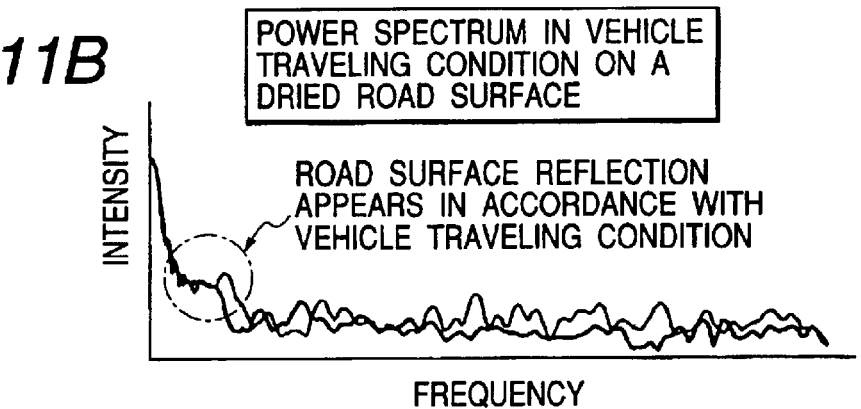
FIG. 11B is a graph showing the frequency spectrum data representing peak frequencies of the ascending and descending sections based on the reflected wave arriving from a close range road surface in the vehicle traveling condition.
Figure 11C:
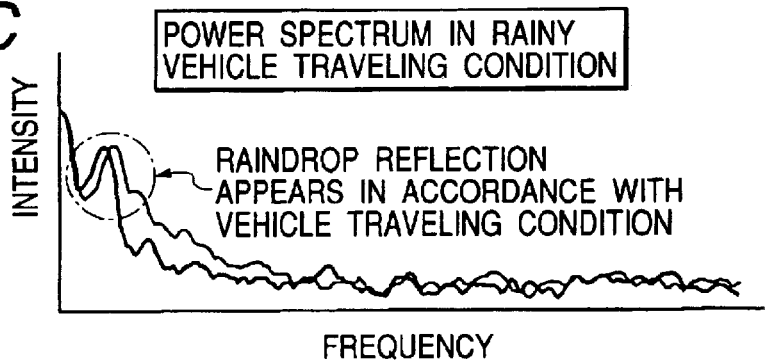
FIG. 11C is a graph showing the frequency spectrum data representing peak frequencies of the ascending and descending sections based on the reflected wave arriving from raindrops in a rainy traveling condition.

According to the vehicle radar apparatus 2 having the above-described arrangement, as shown in FIG. 7A, the radar wave being a frequency modulated continuous wave (FMCW) is transmitted by the transmitter 4 via the transmitting antenna AS. When the radar wave is reflected by a preceding vehicle or other objective, the reflected wave is received by respective receiving antennas AR1 to AR9. Then, the received signals generated by respective receiving antennas AR to AR9 are mixed with the local signal L in respective mixers MX1 to MX9 in the receiver 6 to produce the beat signals B1 to B9 corresponding to the frequency component of the difference between respective received signals and the local signal L (i.e., transmission signal fr). Each of A/D converters AD1 to AD9 performs the sampling of beat signals B1 to B9 predetermined times during a half period of one complete frequency variation of the transmission signal fs, i.e., in each of the frequency ascending section in which the frequency gradually increases and the frequency descending section in which the frequency gradually decreases. Then, respective A/D converters AD1 to AD9 perform the A/D conversion. Through this processing, as shown in FIG. 7B, the beat signal is produced in each of the frequency ascending section and the frequency descending section.

Next, the judging processing for making a judgment as to whether or not the objective is a close range road surface or raindrops as well as the detecting processing for detecting the distance, relative speed, and azimuth of the objective will be explained with reference to a flowchart shown in FIG. 2 and the waveform diagrams of FIGS. 3A to 3E. The processing shown in this flowchart is repeated cyclically.

First, the judgment as to whether or not the objective is a close range road surface or raindrops is carried out based on the following principle. As shown in FIG. 4, if the arriving direction of the reflected wave returning from a preceding vehicle or other objective is inclined with respect to the front face of the antennas AR1 to AR9 being aligned on a line, the propagation distance of the reflected wave will be different in each of respective antennas AR1 to AR9. Accordingly, the reflected wave reaches respective antennas AR1 to AR9 with significant time differences. The time differences are dependent on an angular difference between the front face of the antennas AR1 to AR9 and the arriving direction of the reflected wave (i.e., azimuth of the objective). The difference in the arriving time of the reflected wave appears as phase differences among the received signals (i.e., beat signals B1 to B9).

On the other hand, in the case of the radar wave reflected by a close range road surface or raindrops, the reflected wave will arrive from a wide angular range spreading in front of the radar apparatus 2, not from a specific angle. Accordingly, the received signals (i.e., beat signals B1 to B9) have no phase difference corresponding to any specific azimuth in the case of reflection from a close range road surface or raindrops.

The radar apparatus 2 of this embodiment discriminates the reflected wave returning from a close range road surface or raindrops considering this fact. More specifically, the radar apparatus 2 of this embodiment executes the later-described frequency analysis processing (i.e., distance FFT and azimuth FFT) to convert the phase differences of respective beat signals B1 to B9 into frequency signals. In this case, when the reflected wave arrives from a specific azimuth, the phase differences of respective beat signals B1 to B9 have the regularity. When the phase difference having the regularity is converted into a frequency signal, this frequency signal has a peak appearing at the frequency corresponding to the phase difference. On the other hand, when the reflected wave arrived from a close range road surface or raindrops, the phase differences of respective beat signals B1 to B9 are irregular. The peak frequency intensity of the frequency signal is small compared with the above-described case.

Accordingly, it becomes possible to make a judgment based on the peak frequency intensity of the converted frequency signal as to whether the reflected wave arrives from a close range road surface or raindrops or from a preceding vehicle or other objective.

Hereinafter, the processing for judging whether the objective is a close range road surface or raindrops will be explained with reference to the flowchart of FIG. 2.

Figures 3A, 3B, 3C, 3D, 3E:
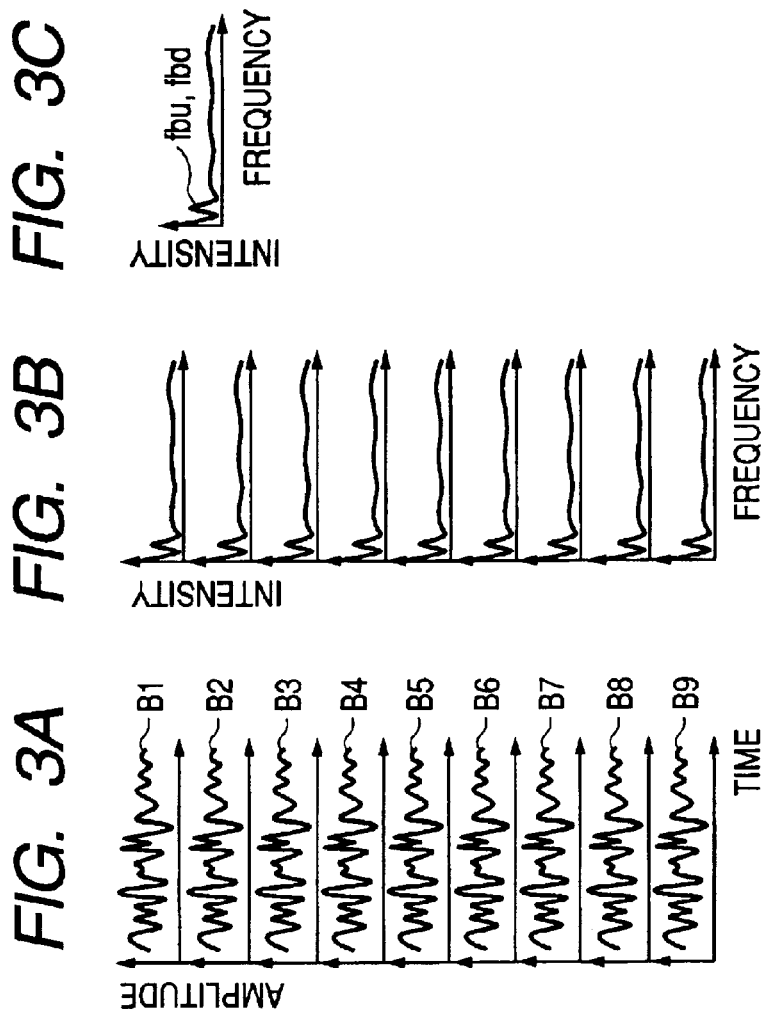
FIG. 3A is a waveform diagram showing the waveforms of beat signals B1 to B9.
FIG. 3B is a waveform diagram showing the spectrum data representing the intensity of respective beat signals B1 to B9 with respect to the frequency.
FIG. 3C is a waveform diagram showing averaged spectrum data, as a result of averaging processing applied to the spectrum data of respective beat signals B1 to B9.
FIG. 3D is a waveform showing the beat frequency signals BF1 to BF9 having peak frequencies in the ascending section and the descending section.
FIG. 3E is a waveform diagram showing the frequency spectrum data obtained by converting the phase difference into the frequency when the phase difference of beat frequency signals BF1 to BF9 is zero.

First, at step S100, the radar wave reflected by a preceding vehicle or other objective is received by the receiver 6. The beat signals B1 to B9 are produced from the receiver 6 and then the digital data D1 to D9 are produced from the A/D converter 8. Reading of the digital data D1 to D9 is executed predetermined times in each of the frequency ascending section and the frequency descending section. The readout digital data are temporarily stored in the RAM. FIG. 3A shows one example of beat signals B1 to B9.

Next, in step S110, the frequency analysis processing (i.e., distance FFT) is executed for the digital data D1 to D9 stored in the RAM. As a result of this distance FFT, a complex vector at each frequency of respective beat signals B11 to B9 is obtained. The absolute value of this complex vector represents the amplitude (i.e., intensity) of a corresponding frequency. Namely, through the distance FFT, the spectrum data representing the intensity of respective beat signals B1 to B9 at each frequency is obtained for example as shown in FIG. 3B. The distance FFT is carried out independently for respective beat signals B1 to B9 in the frequency ascending section and respective beat signals B1 to B9 in the frequency descending section.

Next, in step S120, all of the frequency components corresponding to peaks appearing on this spectrum are extracted based on the frequency spectrum data. Each extracted frequency is specified as peak frequency. In the extraction of these peak frequencies, the averaging processing is executed for averaging the frequency spectrum data calculated for respective beat signals B1 to B9 and the common peak frequency of the beat signals B1 to B9 is extracted based on the averaged spectrum data as shown in FIG. 3C.

Although not shown in FIGS. 3A and 3B, respective beat signals B1 to B9 contain different noises. Furthermore, in the case of reflection from a close range road surface or raindrops, the reflected wave arrives from a wide angular region spreading in front of the vehicle body. The peak frequency itself may deviate. Accordingly, as described above, it is effective to average the spectrum data representing the intensity of frequency components of respective beat signals B1 to B9. And, the common peak frequency of the beat signals B1 to B9 is extracted based on the result of averaging. As the noises are random, executing the averaging processing makes it possible to reduce the noise component intensity relative to the peak frequency intensity. The S/N ratio is improved. The peak frequency of the beat signal can be accurately extracted. Theoretically, each of beat signals B1 to B9 generates a received signal having the same peak frequency component when the reflection wave arrived from the same objective. Accordingly, it is possible to obtain the spectrum data of at least one of beat signals B1 to B9, extract the peak frequency from the obtained spectrum data, and assume that the rest of the beat signals generate the similar peak frequency.

Through the above-described processing of the step S120, the common values of the ascending section peak frequency fbu and the descending section peak frequency fbd are obtained based on the data of respective beat signals B1 to B9. Regarding the detecting method of the peak frequency, it is for example possible to successively check the amplitude change with respect to the frequency, and assume that a peak exists in the vicinity of a specific frequency where the sign of the change amount reverses. This frequency can be identified with a peak frequency.

In step S130, a judgment is made as to whether or not the ascending section peak frequency fbu and the descending section peak frequency fbd are somewhere in a predetermined low-frequency region. In other words, this processing is executed to check if there is a possibility that the ascending section peak frequency fbu or the descending section peak frequency fbd is generated based on the reflected wave returning from a close range road surface or raindrops. More specifically, when the reflected wave returns from a close range road surface or raindrops, the ascending section peak frequency fbu and the descending section peak frequency fbd appear in the low-frequency region due to short distance between the radar apparatus 2 and the close range road surface or the raindrops even when subjected to the Doppler shift.

Accordingly, by checking the frequency band where the ascending section peak frequency fbu and the descending section peak frequency fbd are generated, it becomes possible to stratify an ascending section peak frequency fbu and a descending section peak frequency fbd originated from the reflected wave apparently returning from an objective other than the close range road surface or the raindrops.

It is desirable to change the above predetermined low-frequency region in accordance with the traveling speed of a vehicle. The frequency change caused by the Doppler shift increases with increasing vehicle traveling speed. Accordingly, it is desirable to enlarge the range of the low-frequency region toward a high-frequency side with increasing vehicle traveling speed.

When the ascending section peak frequency fbu and the descending section peak frequency fbd do not belong to the predetermined low-frequency region (i.e., NO in step S130), the control flow proceeds to step S170 to calculate the distance D, relative speed V, and azimuth θ of the detected objective based on the ascending section peak frequency fbu and the descending section peak frequency fbd. Any conventional method for calculating the distance D and the relative speed V of the objective is used in this case. The method of calculating the azimuth θ of the objective will be explained later.

On the other hand, when the ascending section peak frequency fbu and the descending section peak frequency fbd belong to the predetermined low-frequency region (i.e., YES in step S130), the control flow proceeds to step S140. In the step S140, as shown in FIG. 3D, the frequency signals having the ascending section peak frequency fbu and the descending section peak frequency fbd (i.e., beat frequency signals BF1 to BF9) are taken out from respective beat signals B1 to B9. To convert the phase difference of respective beat frequency signals BF1 to BF9 into a frequency, the frequency analysis processing (i.e., azimuth FFT) is performed. FIG. 3D shows a representative one of the frequency signals having the ascending section peak frequency fbu and the descending section peak frequency fbd.

According to this azimuth FFT, a change amount in the phase difference of nine beat frequency signals BF1 to BF9 is converted into the frequency. For example, the phase of beat frequency signal BF1 is designated as an origin. The direction turning to the left from the origin (i.e., the counterclockwise direction) is designated as positive direction. It is now assumed that, among adjacent antennas, the phases of respective beat frequency signals BF1 to BF9 are successively offset in the counterclockwise direction by the amount of 30 degrees. In this case, a total of summed-up rotational speed of nine antennas (i.e., 30×9=270 degrees) is regarded as the frequency. In other words, the number of antennas required for the phase to make a complete rotation (i.e., 360 degrees) is represented as the frequency.

Accordingly, when the phase differences among the beat frequency signals BF1 to BF9 are all zero, the frequency is obtained as 0 Hz. When there is any offset toward the clockwise direction, the frequency is calculated as a negative frequency.

In this manner, to convert the phase difference into the frequency, it is preferable to execute the fast Fourier transformation (i.e., azimuth FFT) applied on the phase difference (being represented in terms of complex number) of respective beat frequency signals BF1 to BF9. Using the azimuth FFT for converting the phase difference into the frequency makes it possible to calculate the frequency spectrum which has the peak frequency (i.e., phase peak frequency) at the frequency corresponding to an azimuth of a detected objective. For example, FIG. 3E shows an example of frequency spectrum according to which the phase differences of respective beat frequency signals BF1 to BF9 are all zero and accordingly the peak appears at 0 Hz.

As described above, when the radar wave is reflected by a close range road surface or raindrops, the reflected wave does not arrive from a specific angle. Therefore, each of the beat frequency signals BF1 to BF9 has no phase difference corresponding to a specific azimuth. Accordingly, when the azimuth FFT is executed on the phase differences of respective beat frequency signals BF1 to BF9, no peak appears at a specific frequency.

FIGS. 5A, 5B, and 5C show the difference of frequency peaks between a case that the objective is a preceding vehicle and another case that the objective is raindrops. FIG. 5A shows average spectrum data resulting through the averaging processing applied on the frequency spectrum data calculated with respect to the beat signals B1 to B9 in the frequency ascending section as well as in the frequency descending section. FIG. 5B shows the result of azimuth FFT (i.e., frequency spectrum data) applied on the phase differences of respective beat frequency signals BF1 to BF9 having an ascending section peak frequency fbu3 and a descending section peak frequency fbd3 originated from the reflected wave returning from raindrops. FIG. 5C shows the result of azimuth FFT (i.e., frequency spectrum data) applied on the phase differences of respective beat frequency signals BF1 to BF9 having an ascending section peak frequency fbu4 and a descending section peak frequency fbd4 originated from the reflected wave returning from a preceding vehicle.

As apparent from FIG. 5B and FIG. 5C, in the case of reflection from raindrops, the sharpness of the spectrum data corresponding to the phase peak frequencies fθu and fθd obtained through the azimuth FFT is not found. On the other hand, in the case of reflection from a preceding vehicle, the phase peak frequencies fθu and fθd of the ascending section and the descending section appear sharp at the same frequency.

The intensity at each frequency of the spectrum data including phase peak frequencies fθu and fθd obtained through the azimuth FFT is influenced by the intensities of the ascending section peak frequency fbu3 and the descending section peak frequency fbd3 on which the calculation is based. Accordingly, criterion values should be determined considering the intensity of ascending section peak frequency fbu3 as well as the intensity of descending section peak frequency fbd3, respectively. Then, the intensities of phase peak frequencies fθu and fθd are compared with these criterion values, to make a judgment as to whether or not the phase peak frequencies fθu and fθd are generated clearly or sharply.

The intensities of the ascending section peak frequency fbu3 and the descending section peak frequency fbd3 used in setting the criterion values can be obtained from the frequency spectrum data of at least one of the beat signals B1 to B9. However, to reduce the adverse influence of noises, it is preferable to use the average frequency spectrum data obtained through the above-described averaging processing Especially, according to this embodiment, the intensity of spectrum data calculated through the azimuth FFT is determined in such a manner that the intensity levels recognizable as clear phase peak frequencies fθu and fθd agree with the ascending section peak frequency fbu3 and the descending section peak frequency fbd3, respectively. Accordingly, in the step S150, the intensities of phase peak frequencies fθu and fθd are compared with the intensities of ascending section peak frequency fbu3 and descending section peak frequency fbd, respectively. When the intensity of phase peak frequency fθu is larger than the intensity of ascending section peak frequency fbu3 or when the intensity of phase peak frequency fθd is larger than the intensity of descending section peak frequency fbd3 (i.e., YES in step S150), at least one of the phase peak frequencies fθu and fθd satisfies the intensity requirements. Thus, it is presumable that a clear phase peak frequency is present. In this case, the control flow proceeds to the step S170 to calculate the distance D, relative speed V, and azimuth θ of a detected preceding vehicle or other objective existing in the direction corresponding to the phase peak frequencies fθu and fθd. In this step S170, the azimuth θ is calculated based on the above-described phase peak frequencies fθu and fθd.

On the other hand, in the step S150, when the intensity of phase peak frequency fθu is equal to or smaller than the intensity of ascending section peak frequency fbu3 and the intensity of phase peak frequency fθd is equal to or smaller than the intensity of descending section peak frequency fbd3 (i.e., NO in step S150), both of the phase peak frequencies fθu and fθd do not satisfy the intensity requirements. Thus, the control flow proceeds to step S160. In the step S160, the objective reflecting the radar wave is identified with a close range road surface or raindrops. Then, the processing is terminated without executing the processing of calculating the distance or the like.

As described above, the vehicle radar apparatus 2 in accordance with this embodiment can surely discriminate the reflected wave returning from an objective existing in a close range of a vehicle from the reflected wave returning from a close range road surface or raindrops.

The vehicle radar apparatus of the present invention is not limited to the above-described embodiment and can be modified in various ways without departing from the gist of the present invention.

Figure 2:
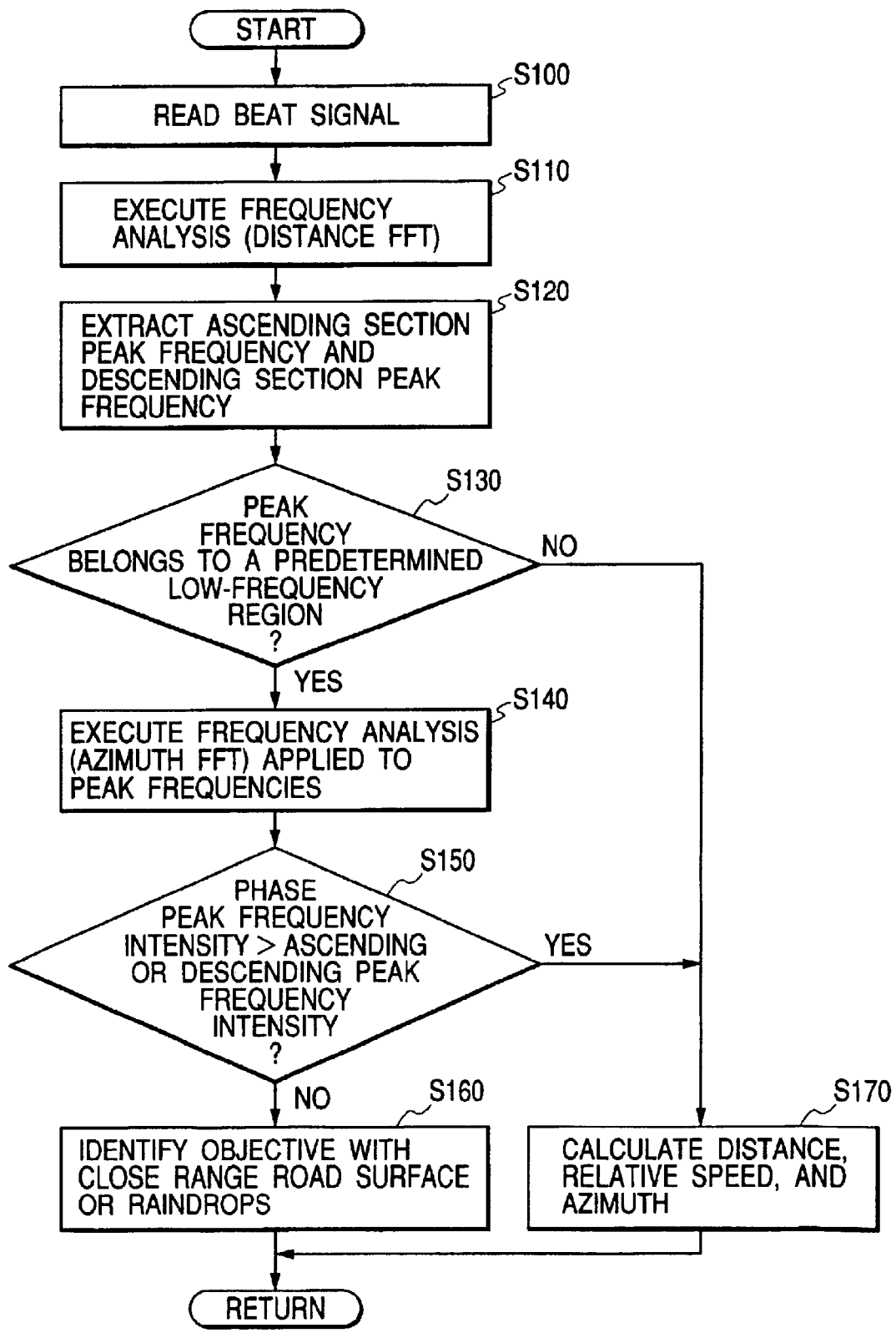
FIG. 2 is a flowchart showing the judging processing for making a judgment as to whether or not the objective is a close range road surface or raindrops, as well as the detecting processing for detecting the distance, relative speed, and azimuth of the objective, both being executed in microcomputer 10.

For example, according to the above-described embodiment, in the step S150 of the flowchart shown in FIG. 2, when the intensity of phase peak frequency fθu is equal to or smaller than the intensity of ascending section peak frequency fbu3 and the intensity of phase peak frequency fθd is equal to or smaller than the intensity of descending section peak frequency fbd3, the reflected wave is judged as having arrived from a close range road surface or raindrops. However, when one of phase peak frequencies fθu and fθd does not satisfy the intensity requirements, it is possible to identify the objective with a close range road surface or raindrops.

Figure 6A:
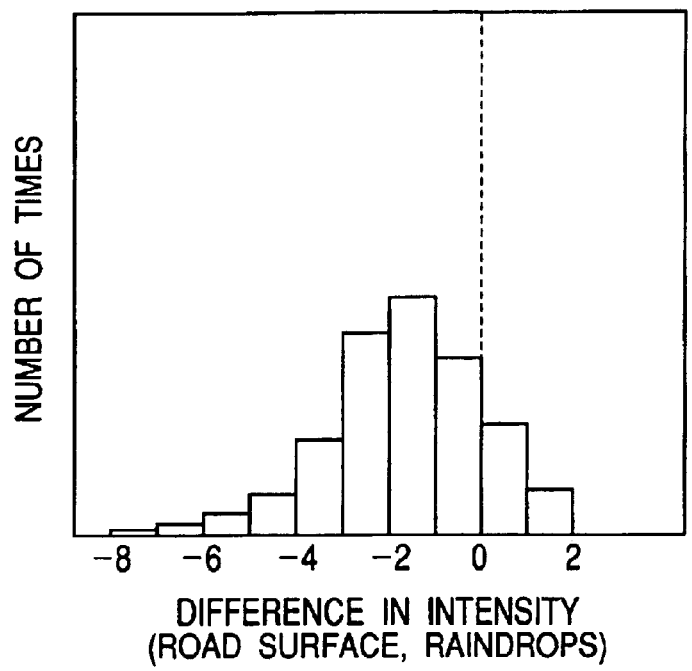
FIG. 6A is a graph showing the distribution of intensity difference between phase peak frequencies fθu, fθd and peak frequencies fbu3, fbd3 of the ascending and descending sections, in the reflection from a close range road surface or raindrops.
Figure 6B:
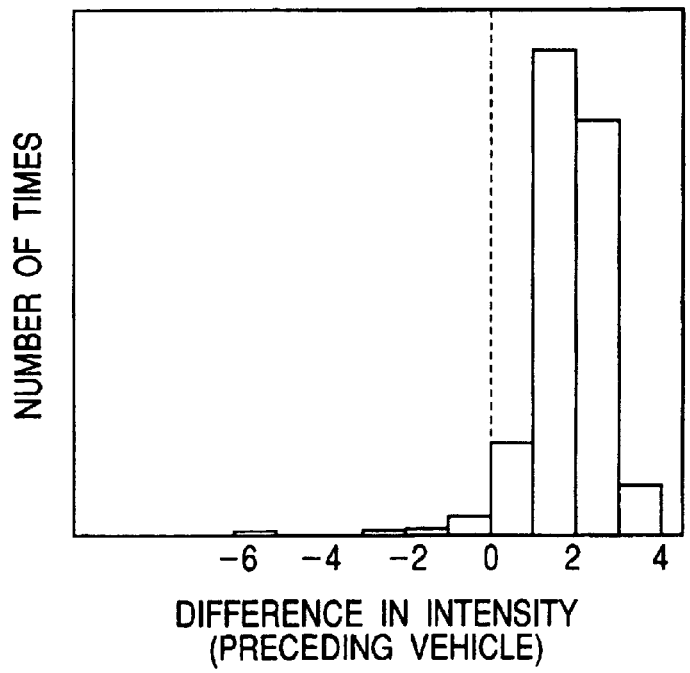
FIG. 6B is a graph showing the distribution of intensity difference between phase peak frequency fθu, fθd and peak frequencies fbu4, fbd4 of the ascending and descending sections, in the reflection from a preceding vehicle.

Furthermore, as shown in FIG. 6A, even in the reflection from a close range road surface or raindrops, there is the possibility that the intensities of phase peak frequencies fθu and fθd may exceed the intensities of ascending section peak frequencies fbu3 and descending section peak frequency fbd3. Furthermore, as shown in FIG. 6B, even in the reflection from a preceding vehicle, there is the possibility that the intensities of phase peak frequencies fθu and fθd may fall below the intensities of ascending section peak frequency fbu4 and descending section peak frequency fbd4. In FIGS. 6A and 6B, the abscissa (being expressed in terms of "db") represents an intensity difference obtained by subtracting the intensities of ascending section peak frequencies fbu3, fbu4 and descending section peak frequencies fbd3, fbd4 from the intensities of phase peak frequencies fθu and fθd.

Accordingly, it is desirable to repeat the comparing processing for comparing the intensities of phase peak frequencies fθu and fθd with the intensities of ascending section peak frequency fbu3 and descending section peak frequency fbd3, and then identify the objective with a close range road surface or raindrops based on the result obtain through the comparing processing performed a plurality of times.

Furthermore, when the phase peak frequencies fθu and fθd are generated clearly or sharply, the phase peak frequency fθu corresponding to the frequency ascending section agrees with the phase peak frequency fθd corresponding to the frequency descending section. Based on this relationship, it is possible to identify the objective with a close range road surface or raindrops by judging whether or not, in at least one the intensities of phase peak frequencies fθu and fθd, the phase peak frequency fθu corresponding to the frequency ascending section agrees with the phase peak frequency fθd corresponding to the frequency descending section.

Furthermore, according to the above-described embodiment, the intensities of phase peak frequencies fθu, and fθd are compared with the intensities of ascending section peak frequency fbu3 and descending section peak frequency fbd3. However, it is possible to experimentally calculate the intensities in the reflection arriving from a close range road surface or raindrops, and memorize the calculated intensities (constant values or variable values depending on the speed). Then, it becomes possible to compare the intensities of phase peak frequencies fθu and fθd with the memorized intensities.

What is claimed is:

1. A vehicle radar apparatus comprising:
transmitting means for transmitting a transmission signal which is frequency modulated so as to change continuously in frequency;

a plurality of receiving means, disposed at predetermined intervals, for receiving reflected waves when said transmission signal is reflected by an objective and for generating a plurality of received signals;

beat signal generating means for generating beat signals each corresponding to a frequency difference between said transmission signal and each of said received signals generated from said plurality of receiving means;

converting means for extracting a peak frequency of at least one beat signal generated from said beat signal generating means and for converting a phase difference of the beat signal at said peak frequency into a frequency signal; and judging means for identifying said objective with a close range road surface or raindrops when a peak frequency intensity of said frequency signal converted by said converting means is smaller than a predetermined criterion intensity.

2. The vehicle radar apparatus in accordance with claim 1, wherein said judging means determines said predetermined criterion intensity with reference to the peak frequency intensity of said beat signal.

3. The vehicle radar apparatus in accordance with claim 1, wherein said judging means determines said predetermined criterion intensity with reference to an average intensity which is obtained by averaging the peak frequency intensity of respective beat signals.

4. The vehicle radar apparatus in accordance with claim 1, wherein said transmission signal includes an ascending section in which the frequency ascends in a predetermined frequency range and a descending section in which the frequency descends in another predetermined frequency range, said converting means extracts, as the peak frequency of said beat signal, an ascending section peak frequency and a descending section peak frequency in said ascending section and said descending section of said transmission signal, respectively, and converts the phase difference of respective beat signals at said ascending section peak frequency and said descending section peak frequency into an ascending section frequency signal and a descending section frequency signal, said judging means identifies said objective with the close range road surface or the raindrops when an ascending section peak frequency intensity of said ascending section frequency signal is smaller than a predetermined criterion intensity determined with reference to an ascending section peak frequency intensity of said beat signal, and when a descending section peak frequency intensity of said descending section frequency signal is smaller than a predetermined criterion intensity determined with reference to a descending section peak frequency intensity of said beat signal.

5. The vehicle radar apparatus in accordance with claim 1, wherein said judging means executes judging processing for comparing the peak frequency intensity of said frequency signal with said predetermined criterion intensity only when the peak frequency of said beat signal is generated in a predetermined low-frequency region.

6. The vehicle radar apparatus in accordance with claim 5, further comprising speed detecting means for detecting a vehicle traveling speed, wherein said judging means changes the range of said low-frequency region in accordance with the vehicle traveling speed detected by said speed detecting means.

7. The vehicle radar apparatus in accordance with claim 1, wherein said converting means calculates the intensity of each frequency by executing frequency analysis on each beat signal, and extracts the peak frequency of said beat signal based on the result obtained by averaging the calculated intensity of said each frequency among respective beat signals.

8. The vehicle radar apparatus in accordance with claim 1, wherein said judging means repetitively executes judging processing for comparing the peak frequency intensity of said frequency signal with said predetermined criterion intensity at predetermined periods, and identifies said objective with the close range road surface or the raindrops based on judgment result obtained through a plurality of comparisons.

* * * * *